US006552278B2

United States Patent
Johnson

(10) Patent No.: US 6,552,278 B2
(45) Date of Patent: Apr. 22, 2003

(54) MULTIPLE LOAD SENSING MULTI-LOAD CELL SCALE AND METHOD

(75) Inventor: Thomas Howard Johnson, Winnebago, MN (US)

(73) Assignee: Weigh-Tronix Inc., Fairmont, MN (US)

( * ) Notice: Subject to any disclaimer, the term of this patent is extended or adjusted under 35 U.S.C. 154(b) by 0 days.

(21) Appl. No.: 09/954,450

(22) Filed: Sep. 10, 2001

(65) Prior Publication Data
US 2003/0056995 A1 Mar. 27, 2003

(51) Int. Cl.$^7$ .................. G01G 19/02; G01G 19/00; G01G 23/01
(52) U.S. Cl. .................. 177/134; 177/199; 177/200; 73/1.13; 702/102; 702/174
(58) Field of Search .................. 177/132, 133, 177/134, 135, 136, 137, 138, 139, 144, 25.13, 50, 141, 211, 199, 200; 178/18.05; 73/1.13; 702/101, 102, 173, 174

(56) References Cited

U.S. PATENT DOCUMENTS

| | | | | |
|---|---|---|---|---|
| 3,533,481 A | * | 10/1970 | Paelian | 177/134 |
| 3,593,263 A | * | 7/1971 | Olsen | 177/134 |
| 3,657,475 A | * | 4/1972 | Peronneau et al. | 178/18.05 |
| 4,815,547 A | * | 3/1989 | Dillon et al. | 177/25.14 |
| 4,889,202 A | * | 12/1989 | Bron | 177/134 |
| 4,909,338 A | * | 3/1990 | Vitunic et al. | 73/1.13 |
| 5,002,141 A | * | 3/1991 | Loshbough et al. | 177/134 |
| 5,167,289 A | * | 12/1992 | Stevenson | 177/25.13 |
| 5,750,937 A | * | 5/1998 | Johnson et al. | 177/25.11 |
| 6,348,663 B1 | * | 2/2002 | Schoos et al. | 177/144 |

* cited by examiner

Primary Examiner—Randy W. Gibson
(74) Attorney, Agent, or Firm—Gray Cary Ware & Freidenrich

(57) ABSTRACT

The multiple load sensing multi-load cell scale is described that provides improved utility to scales with multiple decks that share load cells near supports so that more than one load may be determined at the same time on a single scale. In more detail, the scale uses the sectional sensitivities to load movement on the scale decks, load position and individual normalized load cell outputs to provide separate load magnitude measurements on these individual decks. According to the present invention, more than two load cells associated to form a single scale provide outputs that are converted to individual digital representations of the relative force magnitude on each. These magnitudes are related to the effective location of each load cell to provide the load centroid location on the scale when the sum of the products of the effective location and magnitude of each is divided by the sum of the magnitudes. The scale in accordance with the invention provides the sensitivity of each load cell to load movement on each deck. In particular, the portion of the total scale load on each deck is resolved when these deck loads are moved equally. Individual deck loads are determined by taking advantage of the fact that the change in total load magnitude across a load bearing section of the scale is the result of the product of the sum of products of sectional moment sensitivity, the deck load and the distance the load moves on the deck to cause the change. Equations for section forces supporting each deck provide a set of simultaneous interdependent equations that have a linear solution for the set of individual deck loads.

30 Claims, 6 Drawing Sheets

MULTIPLE LOAD SENSING MULTI-LOAD CELL SCALE AND METHOD

FIELD OF THE INVENTION

The invention relates generally to a weighing system and method and in more detail to a multiple load cell scale that is capable of simultaneously sensing multiple loads on the scale.

BACKGROUND OF THE INVENTION

When two or more decks share load cells, such as in long scales used to measure truck weights, one weight and its associated centroid position may be determined for each deck if the individual load cell force measurements are available. This is typically accomplished by determining each load cell's sensitivity to weight movement on each deck. This sensitivity is then used in conjunction with the centroid position to determine what load (or portion of the load) is being supported by each deck. The individual deck loads and their centroid positions may also be determined, if the total centroid position is available and there is equal movement of the deck loads so that each load remains on a separate deck during movement. A truck's individual axle loads may be determined as well as its weight on a normal truck scale by utilizing a special multi-load cell output analysis. More than one load may be determined at the same time on a multi-deck scale if the centroids of the loads are defined. This enables a single scale to accomplish what would have required multiple scales, saving on scale cost and installation.

A truck's individual axle loads must not exceed road limits and drivers are frequently fined if axle weights are found above these limits. It is therefore desired that axle weights be determined as well as weight on a normal truck scale. Scales with more than one load cell can sense centroid position as well as weight when individual load cell forces are available as disclosed in U.S. Pat. No. 5,750,937 to Johnson. Scales with two load cells can only determine the centroid position in one dimension. Scales with three or more load cells can determine the total load's centroid position in two dimensions. When more than one simply connected decks support the total weight on more than two load cells, the load cells share a portion of the load on each deck. The individual deck loads are not isolated to a set of load cells that are unaffected by another deck load. Thus, the load on each deck is not directly equal to the sum of the forces on any of the individual load cells supporting the deck. The load cell forces are dependent on more than one deck load and a direct solution using only the force measurements is not possible.

Accurate axle weights of trucks have been measured on multiple scales in the past as a general rule. This method is accurate, but requires a scale for each axle on a truck, increasing the cost of the facility. Weighing the total load as the axles were added to the scale and then using the incremental changes in weight to determine the axle weights also was used. This only works if the truck is moving slowly without acceleration or the truck stops after each axle boards the scale and there are level approaches to the scale without bumps. Axle loads can also by measured by tipping the vehicle according to U.S. Pat. No. 5,753,865 to Lechman. This requires two scales with an unusual arrangement. The prior art also describes movable scales such as that disclosed in U.S. Pat. No. 5,583,777 to Power that allow various configurations of wheel loads to be measured. These scale measure the load centroid but require multiple scales.

U.S. Pat. No. 4,667,757 to Johnson discloses a method of determining the spacing between axles using a scale with only two load cells and requires that time measurements be timed to occur when the second axle boards the scale. Centroid measurements are not available in this scale operation. U.S. Pat. No. 5,004,058 to Langford and U.S. Pat. No. 4,804,052 to Griffen address the problem of load position compensation provided a multiple load cell scale. These scales provide individual load cell force information for scale diagnosis and calibration, but do not provide the means of measuring ether centroid positions or multiple loads. U.S. Pat. No. 5,750,937 to Johnson provides a multi-load cell forcing apparatus for measuring the force and its position, but does not provide the means to measure multiple loads and positions.

Thus, it is desirable to provide a multiple load sensing multi-load cell scale that overcomes the above problems and limitations of the prior art and it is to this end that the present invention is directed.

SUMMARY OF THE INVENTION

The multiple load sensing multi-load cell scale in accordance with the invention provides many advantages over conventional systems and provides capabilities not achievable with the typical systems. For example, the invention provides improved utility to scales with multiple deck s that share load cells near supports so that more than one load may be determined at the same time on a single scale. In more detail, the scale in accordance with the invention uses the sectional sensitivities to load movement on the scale deck s, load position and individual normalized load cell outputs to provide separate load magnitude measurements on these individual deck s.

According to the present invention, more than two load cells associated to form a single scale provide outputs that are converted to individual digital representations of the relative force magnitude on each. These magnitudes are related to the effective location of each load cell to provide the load centroid location on the scale when the sum of the products of the effective location and magnitude of each is divided by the sum of the magnitudes. The scale in accordance with the invention provides the sensitivity of each load cell to load movement on each deck. In particular, the portion of the total scale load on each deck is resolved when these deck loads are moved equally. Individual deck loads are determined by taking advantage of the fact that the change in total load magnitude across a load bearing section of the scale is the result of the product of the sum of products of sectional moment sensitivity, the deck load and the distance the load moves on the deck to cause the change. Equations for section forces supporting each deck provide a set of simultaneous interdependent equations that have a linear solution for the set of individual deck loads.

The scale in accordance with the invention also provides, on the above scale, a measure of load position on each deck derived from the magnitude of the deck loads, sectional moment sensitivities, relative load cell locations and intercepts for force versus position dependencies. The intercepts are the effective locations where the force due to a sectional sensitivity is zero. These intercepts are determined by moving a load to a place on one deck at a time and solving for the positions for null force on each load cell section. The positions of the deck loads are then solved for by utilizing the set of equations for the sectional forces with zero intercept compensations equal to the sum of the products of the deck load, deck load position, and moment sensitivity.

The scale in accordance with the invention also provides, on the above scales, a measure of deck load width position on each deck derived from load cell outputs, sectional moment sensitivities, relative load cell locations and zero intercepts for force versus position dependencies. The scale in accordance with the invention also provides another object of the invention, which is to provide the portion of the total scale load on each deck when the position of deck load on each deck between supports is known. Individual deck loads are determined by taking advantage of the fact that the total load magnitude across a load bearing section of the scale is the result of the sum of products of sectional moment sensitivity, the deck load and the distance the load is from the sectional force intercept. Equations for section forces supporting each deck provide a set of simultaneous interdependent equations that have a linear solution for the set of individual deck loads.

Thus, in accordance with the invention, a force sensing apparatus is provided. The force sensing apparatus comprises an operating surface having one or more decks connected together for receiving an applied force from one or more objects and the applied force has a position relative to the operating surface and a magnitude. The force sensing apparatus further comprises a plurality of load cells located adjacent an edge of a deck, each load cell receiving at least a portion of the applied force on the operating surface and providing a force value representative thereof. The force sensing apparatus further comprises a control system that simultaneously determines, based on the force values from the load cells, the location and weight of the one or more objects and outputs one or more signals corresponding to the magnitude of the one or more objects on the force sensing apparatus.

In accordance with another aspect of the invention, a force sensing apparatus is provided comprising a load receiving means having an operating surface with one or more decks connected together that receives an applied force from one or more objects wherein the applied force has a position relative to the load receiving means and a magnitude. The force sensing apparatus further comprises load cell means having a plurality of load cells located adjacent an edge of a deck wherein each load cell receives at least a portion of the applied force on the operating surface and provides a force value representative thereof The apparatus further comprises means for simultaneously determining, based on the force values from the load cells, the location and weight of the one or more objects, and means for outputting one or more signals corresponding to the magnitude of the one or more objects on the force sensing apparatus.

In accordance with another aspect of the invention, a force sensing apparatus for determining the total weight and axle loads of a truck is provided. The apparatus comprises an operating surface having one or more decks connected together for receiving an applied force from the truck wherein the applied force has a position and a magnitude corresponding to each axle of the truck. The apparatus further comprise a plurality of load cells located adjacent an edge of a deck wherein each load cell receives at least a portion of the applied force on the operating surface and providing a force value representative thereof The apparatus further comprises a control system that simultaneously determines, based on the force values from the load cells, the location and load for each truck axle and the total weight of the truck and outputs one or more signals corresponding to the magnitude of the total weight of the truck and the load on each axle.

DETAILED DESCRIPTION OF A PREFERRED EMBODIMENT

The invention is particularly applicable to a truck weighing multi-load cell scale and it is in this context that the invention will be described. It will be appreciated, however, that the multiple load sensing multi-load cell scale and method in accordance with the invention has greater utility, such as to any scale that is used to measure the weight of an object.

Figure 1:
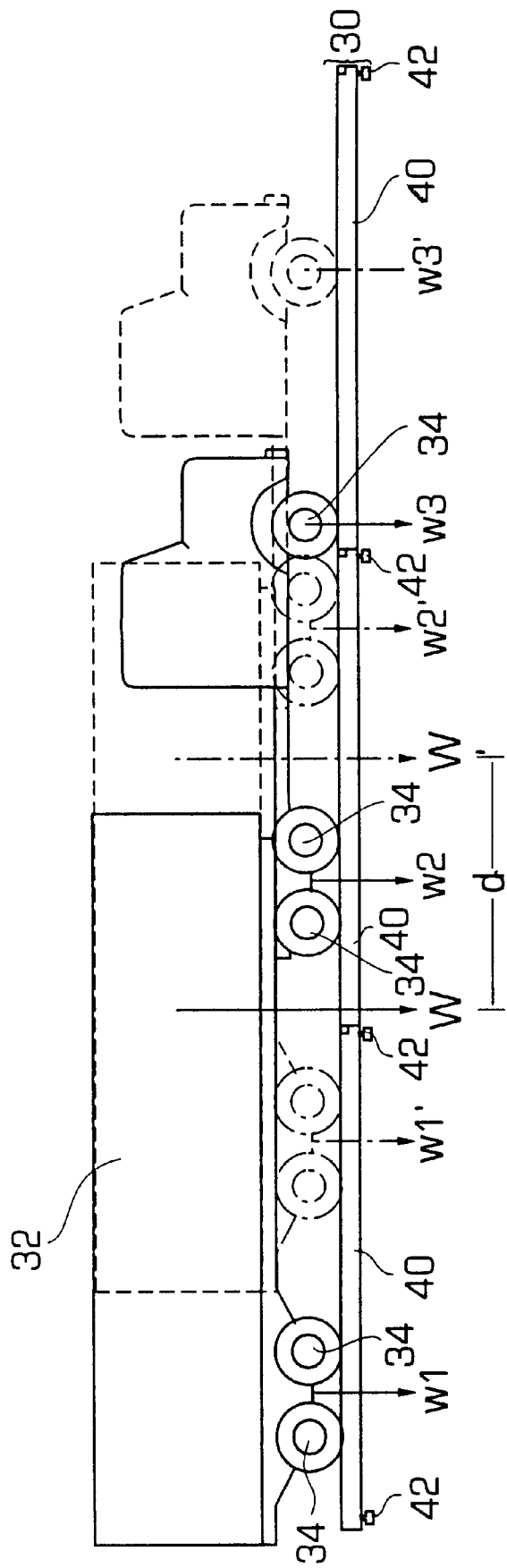
FIG. 1 is a diagram illustrating a multi-load cell scale in accordance with the invention.

FIG. 1 is a diagram illustrating a multi-load cell scale 30 in accordance with the invention. In the example shown, the multi-load cell scale is a truck scale that is being used to weight the truck 32 and, in particular, the loads on each axle 34 of the truck or each pair of axles of the truck. In accordance with the invention, the loads on each axle or pair of axles of the truck may be simultaneously determined as will be described in more detail below. Although a truck scale is shown in FIG. 1, the multiple load sensing multi-load cell scale in accordance with the invention may be used to weigh various different objects in which it is desirable to be able to simultaneously measure multiple loads on the scale. However, to better understand the invention, the truck scale embodiment will be described.

In FIG. 1, the truck 32 is shown in a first position (wherein the truck is shown with solid lines) and in a second position (wherein the truck is shown with dotted lines). In some embodiments of the invention, the multiple different loads are measured when the object moves some measurable distance along the scale as described below. The scale in accordance with the invention may also measure simultaneous loads without having the object move as described below. When the truck is moved on the scale as shown in FIG. 1, the overall weight of the truck, W, moves by some measurable distance, d, to a new position where the total weight is shown as W' to distinguish the new position of the truck weight from the old position of the weight. Similarly, the loads at the axles, W1, W2 and W3, move the same measurable distance and are shown as W1', W2' and W3'. The change in position of the loads of the truck may be used in accordance with the invention to simultaneously determine the total weight of the truck and the loads of each axle of the truck as described in more detail below.

The multi-load cell scale 30 in accordance with the invention may include one or more deck portions 40 (also known as decks) and one or more load cell sections 42 as shown. The load cell sections 42 shown may be pairs of load cells, supporting sections of the scale. In the example shown in FIG. 1, there are three decks and four load cell sections in the positions shown, but the invention is not limited to a particular number of decks or load cells or a particular placement of the load cells relative to the decks. The decks may be typical decks made out of a suitable material to support the weight of the object and the load cells may be well known load cells, such as the monolithic load cells being manufactured and sold by Weigh-Tronix, Inc.

Figure 2:
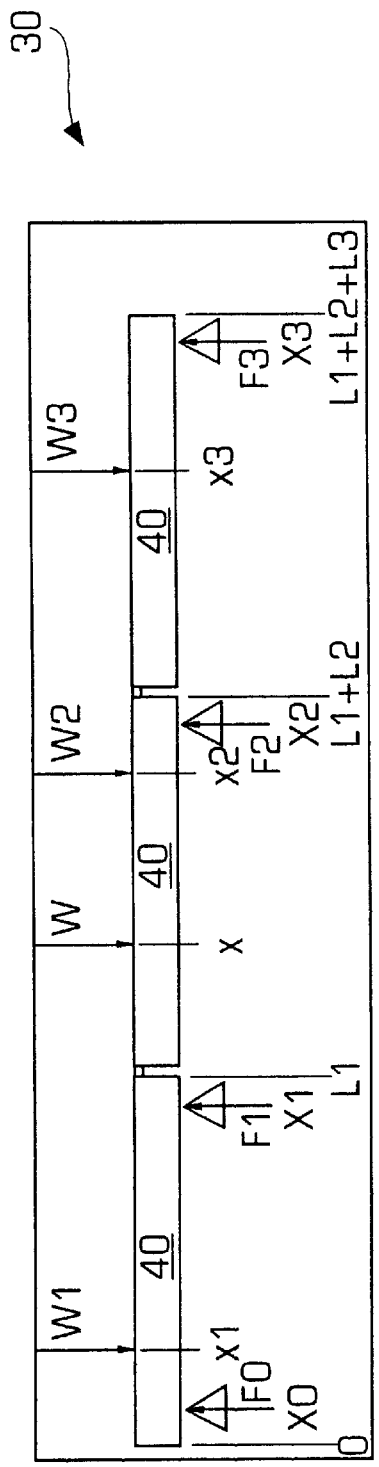
FIG. 2 illustrates more details of the multi-load cell scale in accordance with the invention.

FIG. 2 illustrates more details of the multi-load cell scale 30 in accordance with the invention including the decks 40. In this diagram, the total weight of an object and its constituent parts are shown wherein the object is not being moved. In particular, the total weight of the object, W, is located at position x and the constituent parts of the object's weight, such as W1, W2 and W3, are shown at positions x1, x2 and x3, respectively. FIG. 2 also illustrates the length of each deck, L, such that the length of the scale at the end of the first deck is L1, the total length of the scale at the end of the second deck is L1+L2 and the total length of the scale at the end of the third deck is L1+L2+L3. The force (F0, F1, F2 and F3) applied to each load cell section (not shown) and the position (X0, X1, X2 and X3) of each load cell section are also shown. Now, a weighing system including the multi-load cell scale in accordance with the invention will be described.

Figure 3:
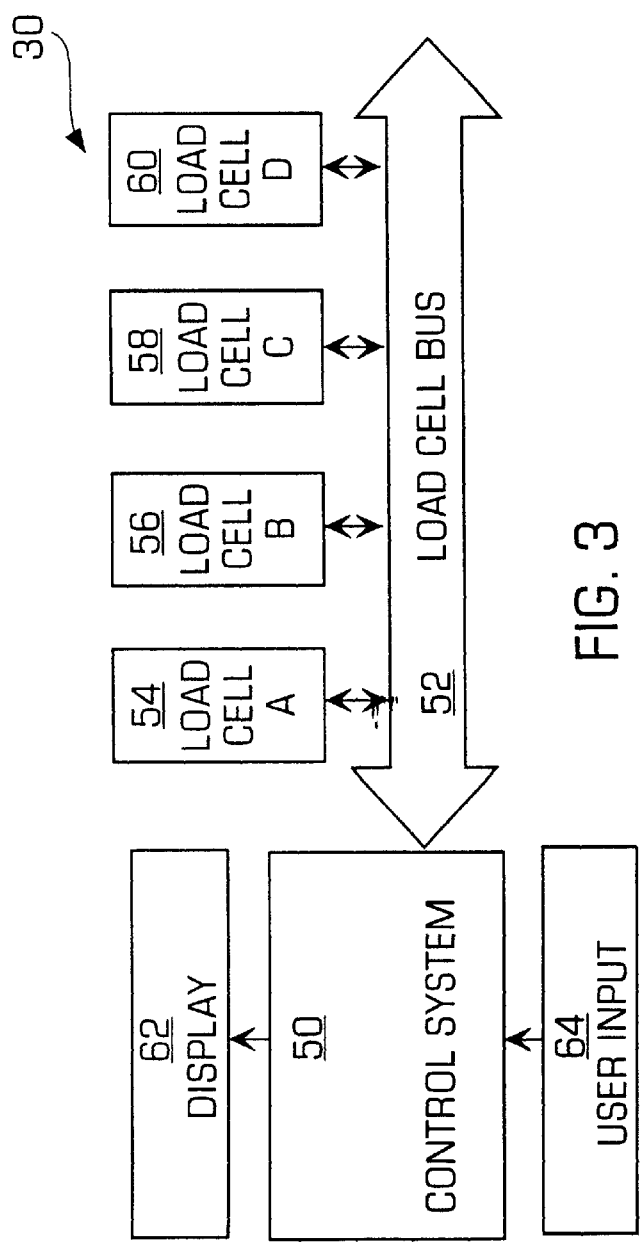
FIG. 3 is a block diagram illustrating the multi-load cell scale in accordance with the invention.

FIG. 3 is a block diagram illustrating more details of the multi-load cell scale 30 in accordance with the invention. The scale 30 may include a control system 50, a load cell bus 52, one or more load cell sections (54–60), a display unit 62 and an input device 64 as shown. In more detail, the control system 50 may be a computer system (having the usual hardware and software components) that is capable of receiving load values from the load cells 54–60 over the load cell bus 52, controlling the load cells using control signals sent to the load cells 54–60 over the load cell bus 52 and processing the load cell values from the load cells to generate a total weight value for the object as well as one or more partial weight values of the object. In accordance with a preferred embodiment of the invention, the control system may include one or more pieces of software that implement the methods described below in order to generate the various measurement values. The load cell bus 52 may be used as a communications path between the load cells 54–60 and the control system 50 so that each load cell is connected to each other load cell as well as the control system 50. The load cells 54–60 may be well known monolithic load cells such as those being manufactured and sold by Weigh-Tronix, Inc. Some of those load cells are also described in U.S. Pat. Nos. 5,313,023, 5,336,854 and 3,650,340 which are owned by the same assignee as the present invention and which are incorporated herein by reference. The display unit 62 may be a typical display, such as a liquid crystal display (LCD) or the like, wherein menus that permit user control of the scale as well as the measurement results generated by the scale may be presented to the user. The user input device 64 may be a typical user input device, such as switches, a keyboard and/or mouse, that permits the user of the scale to control the operation of the scale.

Figure 4:
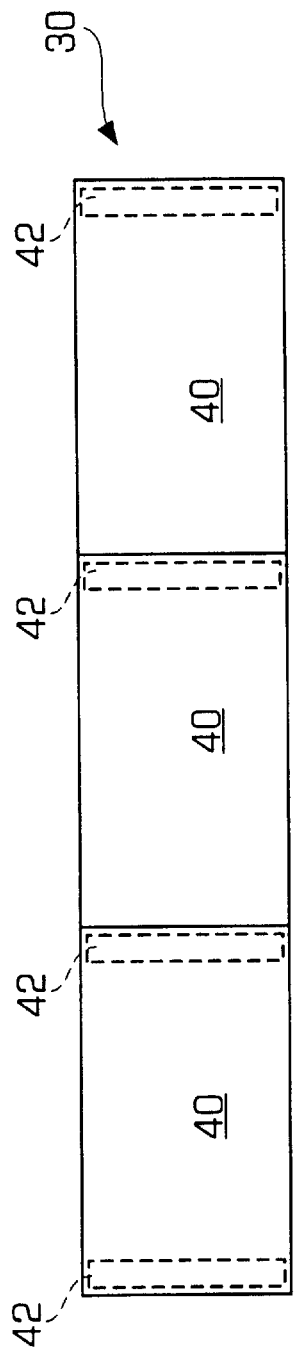
FIG. 4 is a top view of the multi-load cell scale in accordance with the invention.

FIG. 4 is a top view of the multi-load cell scale 30 in accordance with the invention including the decks 40 and the load cell sections 42 located underneath the decks. FIG. 4 illustrates an example of the positions of the load cell sections 42 relative to the decks of the scale. In a preferred embodiment, there may be two load cell sections underneath the first deck, and one load cell section underneath each other deck as shown. As set forth above, however, the scale in accordance with the invention is not limited to a particular number of load cells, a particular number of decks or a particular location of the load cells relative to the decks. Now, the operating principles of the multiple load sensing multi-load cell scale in accordance with the invention will be described in more detail.

Operational Principles

When more than two load cells with individual digital outputs are used in a scale with two or more support decks decoupled in at least one direction, sharing at least one load cell, information involving multiple loads and centroid positions may be used in its operation and measurements in accordance with the invention. In particular, each load cell can be characterized with multiple installed weight-determining-coefficients and relative support position coordinates. This allows easier cornering of the multi-load-cell scales as well as the ability to determine the loads and positions on each deck directly below the centroid of the applied load on each. There is also the ability of determining the position of an impulse applied to the scale as well as the steady weights on the deck.

When impulse recognition software is provided with position outputs from the scale in accordance with the invention, there are many applications including keyboards consisting of marked areas on the scale decks. The software would require a pulse thresholds and duration range to avoid noise problems. These aspects are described in more detail in U.S. Pat. No. 5,750,937 to Johnson et al which is owned by the same assignee as the present invention and is incorporated herein by reference.

Automatic Scale Cornering Calibration

If the load cells do not maintain span calibration in the scale because of imperfect installation, span factors must be determined to prevent errors due to these imperfections. Imperfections may be parallel spring effects from objects attached to the scale, nonlevel mounting of the cells, or lever effects in some types of scales. To determine a span factor for each load cell an equation for each load cell must be defined. One equation may be generated for each location the calibration weight is applied. The total force from all of the load cells must equal to the value of the calibration weight.

$$W_k = \sum_{i=1}^{m} \sum_{j=1}^{2} F_{i,j,k} \cdot s_{i,j}$$

$s_{i,j}$ are the span factors for each load cell;
$W_k$ are the calibration weight values; and
$F_{i,j,k}$ are the forces measured by each load cell.
The relationship of the indices are:
"i" indicates the load cell's location in the physical array in the length "x" direction of the scale;
"j" indicates the load cell's location in the position array in the width "y" direction, of the scale;
"k" indicates the application sequence number of the calibration weight; and
"m" indicated the number of load cell pair sections along the length of the scale.

The span factors for each load cell $s_{i,j}$ may be determined by solving the "2m" simultaneous equations as is well known.

Load Cell Location Calibration

The effective positions of the load cells "X and Y" may be determined by applying a calibration weight in as many "k" different locations (approximately over each load cell) as there are load cells. These locations are measured from a fixed reference point on the plane of the scale to provide an "x" and "y" coordinate for each position at which the weight is applied. For the coordinates of each load cell, an equation for each coordinate of each load cell can be defined. Since the scale is stationary, the moments about the "x" and "y" axes cancel and two equations may be generated for each location at which the calibration weight is applied. The calibration input requires the calibration weight $W_k$, and "x" and "y" coordinates at the "k" locations, and all of the span factors $s_{i,j}$ and the load cell outputs $F_{i,j,k}$. One equation may be generated for each location the calibration weight is applied. The total moment in each direction divided by the calibration weight must be equal to the calibration weight centroid coordinate.

$$x_k = \frac{\sum_{i}^{m}\sum_{j}^{2} F_{i,j,k} \cdot s_{i,j} \cdot X_{i,j}}{W_k} \text{ and } y_k = \frac{\sum_{i}^{m}\sum_{j}^{2} F_{i,j,k} \cdot s_{i,j} \cdot Y_{i,j}}{W_k}$$

$X_{i,j}$ are x-direction coordinates on the deck directly above the load cells' effective support point $Y_{i,j}$ are y-direction coordinates on the deck directly above the load cells' effective support point $F_{i,j,k}$ are the forces measured by each load cell due to the applied calibration weight $W_k$.

$x_k$ is the x-direction coordinate on the deck under the centroid of the calibration weight $W_k$; and $y_k$ is the y-direction coordinate on the deck under the centroid of the calibration weight $W_k$ The load cell coordinates $X_{i,j}$ and $Y_{i,j}$ may be determined by solving the two sets of "2m" simultaneous equations as is well known.

Load Centroid Coordinates

The centroid position of an applied load is determined by taking the ratios of total moments about the relative fixed reference frame to total weight. This again is derived from the static scale conditions where moments about the "x" and "y" axes cancel and the total supporting force is equal to the applied weight. Three equations may be generated for each location the applied weight is positioned. The total applied weight must be equal to the sum of all the spanned load cell loads and the load centroid coordinates "x" and "y" must be equal to the sum of all the load cell moments in each direction divided by the total load.

$$x = \frac{\sum_{i=1}^{m}\sum_{j=1}^{2} F_{i,j} \cdot X_{i,j} \cdot s_{i,j}}{W} - x0;$$

$$y = \frac{\sum_{i=1}^{m}\sum_{j=1}^{2} F_{i,j} \cdot Y_{i,j} \cdot s_{i,j}}{W} - y0 \text{ and}$$

$$W = \sum_{i=1}^{m}\sum_{j=1}^{2} F_{i,j} \cdot s_{i,j}$$

x is the x-direction coordinate on the deck under the centroid of the applied weight y is the y-direction coordinate on the deck under the centroid of the applied weight x0 and y0 are offsets from calibration coordinates of the coordinates defining a relative origin.

$F_{i,j}$ are the forces on the individual load cells in the "i", "j" array due to the applied weight The position is not a function of the applied force. The resolution of the position may however be effected by the magnitude of the applied weight. The resolution is also a function of the distribution of the applied weight, or force, and the time allowed for response.

Section Load Calculations

If movement will be constrained mainly to one direction, loads on pairs of load cells may be determined, reducing the position sensing to the direction of movement.

$$Fs_i = \sum_{j=1}^{2} F_{i,j}$$

$F_{i,j}$ are the forces on the individual load cells on the side "j" of the scale at the "i" section due to the applied section force $Fs_i$. The forces for "m" sections can then be calculated as is well known.

Sectional Sensitivity to Moment

When a weight is moved on each deck individually, the change in sectional forces produced by the effective change in position may be determined.

$$\Delta Fs_{i,v} = Ms_{i,v} \cdot w_v \cdot \Delta x_v \text{ and } \Delta Fs_{i,v} = Fs_{i,v}(x_v + \Delta x_v) - Fs_{i,v}(x_v)$$

where $Ms_{i,v}$ are the sensitivities of sectional forces $Fs_i$ to moment change about the y axis due to deck weight $w_v$ movement $\Delta x_v$ on deck "v";

$\Delta Fs_{i,v}$ are the changes in section loads on the sections "i" due to load movement on deck "v".

$Fs_{i,v}(x_v)$ are the section loads on the sections "i" due to load on deck "v" at $x_v$; and $Fs_{i,v}(x_v + \Delta x_v)$ are the section loads on the sections "i" due to load on deck "v" at $x_v + \Delta x_v$.

$$Ms_{i,v} = \frac{\Delta Fs_{i,v}}{\Delta x_v \cdot w_v}$$

The above m·(m−1) equations are independent when one deck is loaded at a time. Then $\Delta x_v$ and $w_v$ may be measured from the calibrated scale output as $\Delta x$ and W. Any object with sufficient weight that may be moved sufficiently on each deck can be used to obtain the data for these sensitivities. The accuracy of these sensitivities depends directly on the product of the weight and the distance it is moved. Therefore, a short heavy load is most desired for this calibration.

Individual Deck Load Solutions Requiring Movement

When weights have fixed spacing, as in truck axles, and they are moved, the individual deck weight movements are equal to the change of the total weight's centroid. Individual deck loads may be approximately determined using the measured change in sectional forces and centroid change when the decks are simply supported between each other while sharing load cells Y and the weights are moved so that each remains completely on a deck.

$$\frac{\Delta Fs_i}{\Delta x} = \sum_{v=1}^{m-1} Ms_{i,v} \cdot p_v$$

where $Ms_{i,v}$ are the sensitivities of sectional forces $Fs_i$ to moment change about the y axis due to deck loads $p_v$ movements $\Delta x$ on decks "v"; and $\Delta Fs_i$ are the changes in section loads on the individual sections "i" due to load movement.

A set of "m−1" simultaneous equations can be then solved for $p_v$. Since one fewer decks exist than the number of sections "m", the data from the first load cell section of the deck with two load cell sections directly supporting it may be ignored. These loads are only equivalent to individual weights if there are no couples induced by forces between weights on the space fixing elements connecting them. The rolling friction in the tires of a truck can produce these forces, and cause a load transfer from the pulling axle to a trailing axle. The actual weights may be more accurately determined if the average of loads from data taken while stopping and moving from forward and reverse movements is used. If rolling friction is low the error is small and may be ignored for approximate measurements. The deck loads can be calculated as the truck is in motion without stopping, if a fast computer is used for the solution, and the truck does not accelerate or decelerate while on the scale. The queuing of data and recognition of load transfer to each deck allows the timing of data to be so that the deck loads used are near the ends of the deck without load crossing to the next deck.

Individual Deck-side Load Solutions Requiring Movement

When weights have fixed spacing, as in truck axles, and they are moved, the individual deck weight movements are equal to the change of the total weight's centroid. The portion of load on each side of each deck may be determined when the weights are moved so that each remains completely on a deck with the decks simply supported between each other while sharing load cells, by using the measured change in load cell forces, the sectional moment sensitivities and centroid changes.

$$\frac{\Delta F_{v+1,j}}{\Delta x} = \sum_{i=2}^{m} \frac{Ms_{i,j} \cdot p_{v,j}}{2}$$

$p_{v,j}$ are the loads on the "j" side of decks "v"

$Ms_{i,v}$ are the sensitivities of sectional forces $Fs_i$ to moment change about the y axis on deck "v".

$\Delta F_{v+1,j}$ are the changes in load on the individual load cells in the "v+1" section and "j" side due to load movement $\Delta x$.

Since, each load cell in each section has been spanned to have consistent output in the cornering calibration, the moment sensitivities on each side of a section are half that of the section. This data may be used to determine the y-direction position of the deck load centroids.

Force Intercept Calculations

Once the scale is calibrated for accurate weight and centroid measurement, a weight moved to a place on each individual deck can be measured with its x-direction centroid position. Then effective centroid positions where forces on sections $Fs_i$ from the applied deck weight $w_v$ are zero can be determined.

$$x0_{i,v} = x_v - \frac{Fs_{i,v}}{Ms_{i,v} \cdot w_v}$$

$Ms_{i,v}$ are the sensitivities of sectional forces $Fs_i$ to moment change about the y axis due to deck weights $w_v$ positioned at $x_v$ on decks "v".

$Fs_{i,v}$ are the section loads on the individual sections "i" due to weight $w_v$ placements on decks "v".

$x0_{i,v}$ are the effective load centroid positions in the x-direction where forces on sections $Fs_i$ from the deck loads $w_v$ are zero.

The above m·(m−1) equations are independent when one deck is loaded at a time. $x_v$ and $w_v$ become x and W and may be measured from the calibrated scale output. Any object with sufficient weight may be moved to a position on each deck to obtain the data for these intercepts. This data may be stored for use in deck load solutions requiring positioning.

Multiple Deck Load Centroid Calculations

Once the scale is calibrated for accurate weight, centroid and deck load measurement, a set of weights with fixed spaces placed on the scale can be measured separately when the weights are moved as above. Then equations depending on the effective x-direction centroid positions $x_v$ force intercepts $x0_{i,v}$ moment sensitivities $Ms_{i,v}$ section loads $Fs_i$ and deck loads $p_v$ can be defined.

$$Fs_i + \sum_{v=2}^{m} Ms_{i,v} \cdot x0_{i,v} \cdot p_v = \sum_{v=2}^{m} Ms_{i,v} \cdot p_v \cdot x_v$$

$Ms_{i,v}$ are the sensitivities of sectional forces $Fs_i$ to moment change about the y axis.

$Fs_i$ are the section loads on the individual sections "i" due to total weight "W".

$x0_{i,v}$ are the effective load x-direction positions where forces on sections $Fs_i$ from the deck loads $w_v$ are zero.

$p_v$ are the calculated loads on decks "v".

$x_v$ are the calculated x-direction centroid of deck loads $p_v$.

The above set of m−1 simultaneous equations can be solved for the deck load centroids $x_v$. For a truck, the center of the steering axle wheels would be at the centroid of the steering axle load. The centroid of tandem axles on a truck would be approximately in the center of a uniformly spaced group. This will vary if the springs are not matched. This provides calculated centroids that are more accurate than measured ones. Trucks of the same configuration may not have exactly the same axle load centroid spacing.

Deck Load Centroid Spacing Calculations

Once the deck load centroids are determined, the relative spacing of the centroids can be determined.

$$d_u = x_{m-1} - x_u$$

where $d_u$ are the distances of the deck load centroids $x_u$ from the one $x_{m-1}$ on the last deck.

Then the positions of all of the load centroids can be calculated if the position of one of them is recognized. Once a truck's axle spaces are measured and recorded, the truck only has to stop with its steering axle at a recognizable position for the axle weights to be calculated. Then effective relative centroid spacings $d_u$ between load centroid $x_{m-1}$ and the other load centroids can be determined.

$$x_u = x_{m-1} - d_u$$

This data may be stored for use in deck load solutions requiring positioning.

Individual Deck Load Solutions Requiring Positioning

Individual deck loads may be determined when the weights are positioned completely and separately on each deck and the decks are simply supported between each other, sharing load cells, using the measured sectional forces from the application of the loads and the centroid position of each load.

$$Fs_{v+1} = \sum_{i=2}^{m} Ms_{i,v} \cdot \Delta x_{i,v} \cdot p_v \text{ and } \Delta x_{i,v} = x_v - x0_{i,v}$$

$Ms_{i,v}$ are the sensitivities of sectional forces $Fs_i$ to moment change due load movement on deck "v".

$Fs_{v+1}$ are the section loads on the individual sections "v+1" due to load placement.

$x0_{i,v}$ are the effective intercepts where the effect of deck loads $p_v$ on section forces $Fs_{v+1}$ are zero $\Delta x_{i,v}$ are the effective load position offsets form a position where forces on section $Fs_{v+1}$ from the deck load $p_v$ is zero.

$x_v$ are the provided positions of load on the decks "v" from measurements or stored data.

The above m−1 simultaneous equations can be solved for $p_v$. These are only equivalent to individual weights if there are no couples induced by force between weights caused by the space fixing elements connecting them. The rolling friction in the tires of a truck can produce these forces, and cause a load transfer from the pulling axle to a trailing axle. The actual weights may be nearly extracted if the calculated loads determined while stopping from forward and reverse movements are averaged.

Individual Side Deck Load Solutions Requiring Positioning

Individual side deck loads may be determined when the weights are positioned completely and separately on each deck and the decks are simply supported between each other, sharing load cells, using the measured change in sectional forces from the application of the loads and the centroid of each load.

$$Fs_{v+1,j} = \sum_{i=2}^{m} \frac{Ms_{i,v}}{2} \cdot \Delta x_{i,v} \cdot p_{v,j} \text{ and } \Delta x_{i,v} = x_v - x0_{i,v}$$

$Ms_{i,v}$ are the sensitivities of sectional forces $Fs_i$ to moment change about the y axis due to deck loads $p_v$.

$Fs_{v+1,j}$ are the load cell loads on side "j" of the individual sections "v+1" due to deck side load $p_{v,j}$ placement.

$x0_{i,v}$ are the effective intercepts where the effect of deck loads $p_v$ on section forces $Fs_i$ are zero $\Delta x_{i,v}$ are the effective load position offsets form a position where forces on section $Fs_i$ from the deck load $p_v$ is zero.

$x_v$ are the entered load positions on the decks "v" from measurements or a database.

The above two sets of m−1 simultaneous equations can be solved for the 2(m−1) values of $p_{v,j}$. These are only equivalent to individual loads if there are no couples induced by force between weights caused by the space fixing elements connecting them. The rolling friction in the tires of a truck can produce these forces, and cause a load transfer from the pulling axle to a trailing axle. The actual weights may be nearly extracted if the calculated loads determined while stopping from forward and reverse movements are averaged.

Individual Deck y-direction Centroid Coordinates

Once the load cell support coordinates and the deck loads and the side deck loads are calculated, the y-direction centroid position of an applied load is simply defined. An equation for each y-direction deck load centroid is defined from the average of both side loads for each deck.

$$y_v = Y_{v,1} + \frac{(Y_{i,2} - Y_{i,1})}{2} \left[ \frac{p_{v,2}}{p_v} + \left(1 - \frac{p_{v,1}}{p_v}\right) \right] - y0$$

where $y_v$ are the y-direction deck load centroids on the decks "v";

y0 is an offset from the calibration coordinate of the coordinate defining a relative origin;

$p_{v,1}$ and $P_{v,2}$ are the side deck loads on side "1" and "2" of decks "v";

$p_v$ are the total deck loads on the of decks "v"; and $Y_{i,1}$ and $Y_{i,2}$ are the y-direction coordinate of the load cells under the deck "v" on each side.

Assignable Values for Cell Definition

The intelligence available on each load cell may be made common having the same software. Each load cell is defined as a numeric element "u" in the group of load cells n supporting the scale deck. Each load cell is assigned defining values for span correction, its x coordinate and its y coordinate as calculated from the scale setup calibration data.

$n, s_u, X_u \text{ and } Y_u$

Alternate Solution for Multiple Deck Loads

Figure 5:
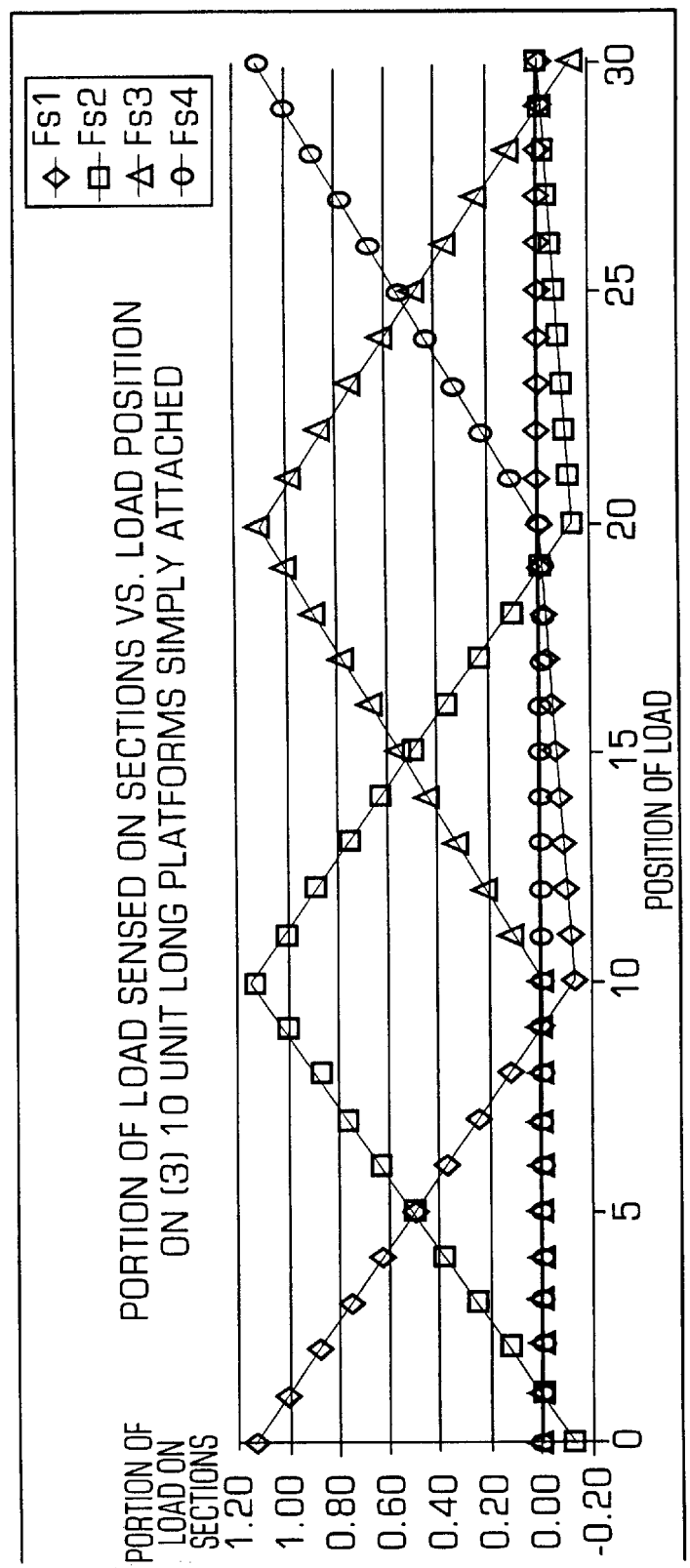
FIG. 5 is a chart illustrating the portions of a load sensed on the one or more sections of the multi-load cell scale.

When a scale has decks supported by shared load cells, the force centroid and the load on each deck may be determined, even though the decks are all loaded at the same time. An example of such a scale is depicted in FIG. 2 above. As shown, three decks of lengths "L1, L2, and L3" are loaded with local weights respectively: "W1, W2, and W3" at respective locations: "x1, x2, and x3". The center of mass on the scale is "W" at location "x". The load is supported by four sections with load cells at definable locations: "X0, X1, X2, and X3", producing respective load cell forces: "F0, F1, F2, and F3" which are measured by the load cells. An example of the loads on each load cell of a scale in accordance with the invention is shown in FIG. 5.

The total weight and the its centroid may be determined:

$$W = F0 + F1 + F2 + F3 \text{ and } x = \frac{X0 \cdot F0 + X1 \cdot F1 + X2 \cdot F2 + X3 \cdot F3}{W}$$

If the local load centroid locations x3 and x2 are defined and the load cell locations and forces are determined, the local weights may be defined by the following equations:

$$W3 = \frac{F3}{a3}; W2 = \frac{F2 - W3(1 - a3)b3}{a2}$$

$$W1 = F0 + F1 - W2 \cdot (1 - a2) - W3 \cdot (1 - a3) \cdot (1 - b3) \text{ or } W1 = W - W2 - W3$$

where:

$$a2 = \frac{x2 - L1}{X2 - L1}; a3 = \frac{x3 - L1 - L2}{X3 - L1 - L2}; \text{ and } b3 = \frac{L2}{X2 - L1}$$

The centroid of "W1" may be determined by the equation:

$$x1 = \frac{X0 \cdot F0 + X1 \cdot F1 + X2 \cdot F2 + X3 \cdot F3 - x2 \cdot W2 - x3 \cdot W3}{W1}$$

If the local load centroids x3 and x2 are not define but all the local weights are all moved the same distance "Δx" on the scale and the load cell locations and forces are determined, the local weights may be defined by the following equations:

$$W3 = \frac{\Delta F3 \cdot c3}{\Delta x}; \quad W2 = \frac{\Delta F2 \cdot c2 + \Delta F3 \cdot L2}{\Delta x}$$

$$W1 = \frac{\Delta F1 \cdot c1 + (\Delta F2 + \Delta F3) \cdot d1}{\Delta x} \text{ or } W1 = W - W2 - W3 \text{ and}$$

$$\Delta x = \frac{X0 \cdot \Delta F0 + X1 \cdot \Delta F1 + X2 \cdot \Delta F2 + X3 \cdot \Delta F3}{W}$$

where:

c1=X1–X0; c2=X2–L1; c3=X3–L1–L2 and d1=L1–X0

Rows of Load Cells

When the scale has two rows of load cells supporting opposite sides of a long scale with multiple decks sharing the load cells, the equations above may be used for each side row to determine the weight born on each side on each deck.

For Side One:

$$W31 = \frac{\Delta F31 \cdot c31}{\Delta x1}; \quad W21 = \frac{\Delta F21 \cdot c21 + \Delta F31 \cdot L21}{\Delta x1}$$

$$W11 = \frac{\Delta F11 \cdot c11 + (\Delta F21 + \Delta F31) \cdot d11}{\Delta x1} \text{ or}$$

$$W11 = WT1 - W21 - W31 \text{ and}$$

$$\Delta x1 = \frac{X01 \cdot \Delta F01 + X11 \cdot \Delta F11 + X21 \cdot \Delta F21 + X31 \cdot \Delta F31}{WT1}$$

where:

c11=X11–X01; c21=X21–L11; c31=X31–L11–L21 and d11=L11–X01

For side two:

$$W32 = \frac{\Delta F32 \cdot c32}{\Delta x}; \quad W22 = \frac{\Delta F22 \cdot c22 + \Delta F32 \cdot L22}{\Delta x2}$$

$$W12 = \frac{\Delta F12 \cdot c12 + (\Delta F22 + \Delta F32) \cdot d12}{\Delta x2} \text{ or}$$

$$W12 = WT2 - W22 - W32 \text{ and}$$

$$\Delta x2 = \frac{X02 \cdot \Delta F02 + X12 \cdot \Delta F12 + X22 \cdot \Delta F22 + X32 \cdot \Delta F32}{WT2}$$

where:

c12=X12–X02; c22=X22–L12; c32=X32–L12–L22 and d12=L12–X02

The total load on a deck may be determined by adding the two side loads.

W3=W31+W32; W2=W21+W22

W1=W11+W12 or W1=W–W2–W3 and

The position of the center-of-gravity in the direction perpendicular to x may be determined for each deck load.

$$y1 = \frac{W12}{W1} \cdot Y1 \text{ and } y2 = \frac{W22}{W2} \cdot Y2 \text{ and } y3 = \frac{W32}{W3} \cdot Y3$$

Here Y1, Y2 and Y3 are the spacing between rows on each deck.

Now, the method for calibration and measurement in accordance with the invention using the above scale will be described in more detail.

Figure 6:
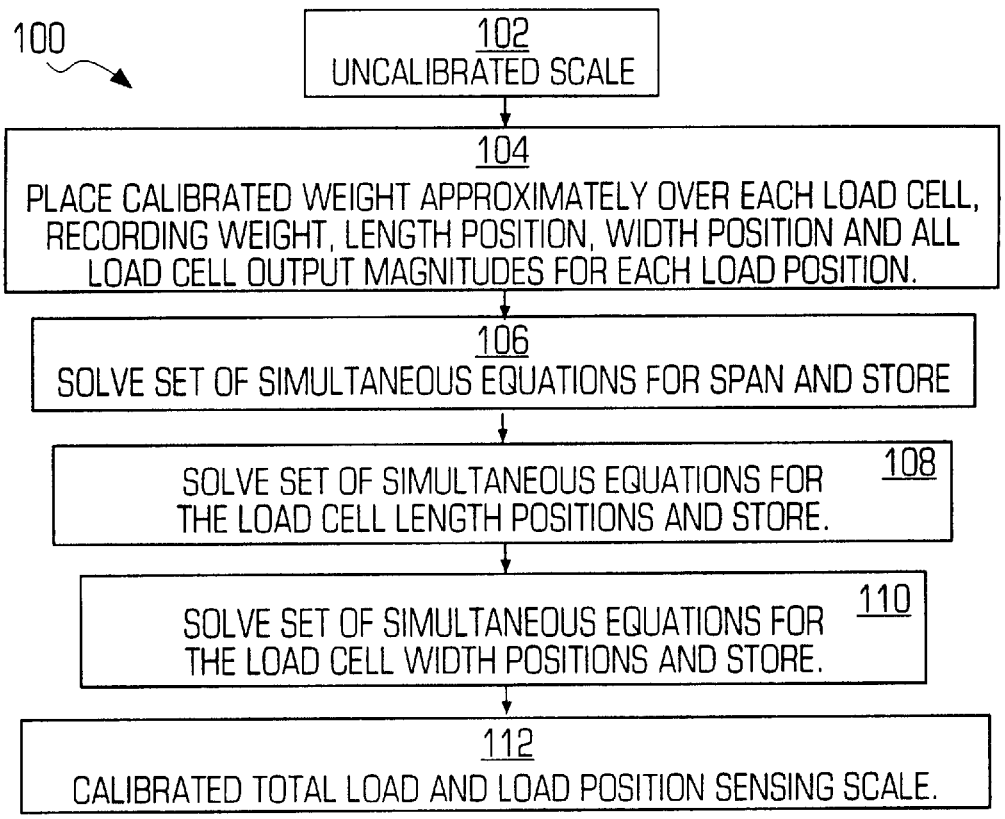
FIG. 6 illustrates a preferred embodiment of a scale calibration method in accordance with the invention for a total load and load position sensing scale.

FIG. 6 illustrates a preferred embodiment of a scale calibration method 100 in accordance with the invention for a total load and load position sensing scale. In step 102, an uncalibrated scale is prepared for calibration. In step 104, a calibrated weight is moved to a place approximately over each load cell in the scale wherein the weight, length position and width position of the calibration weight are measured. Then, the outputs of all of the load cells magnitudes at each load position are gathered. In step 106, as described above, the set of simultaneous equations is solved for the span of each load cell and then stored. In step 108, a set of simultaneous equations as described above are solved for the load cell length positions and these values are stored. In step 110, a set of simultaneous equations is solved as described above for the load cell width position and those values are stored. In step 112, the calibrated total load and load position for the sensing scale is determined and the scale has been calibrated.

Figure 7:
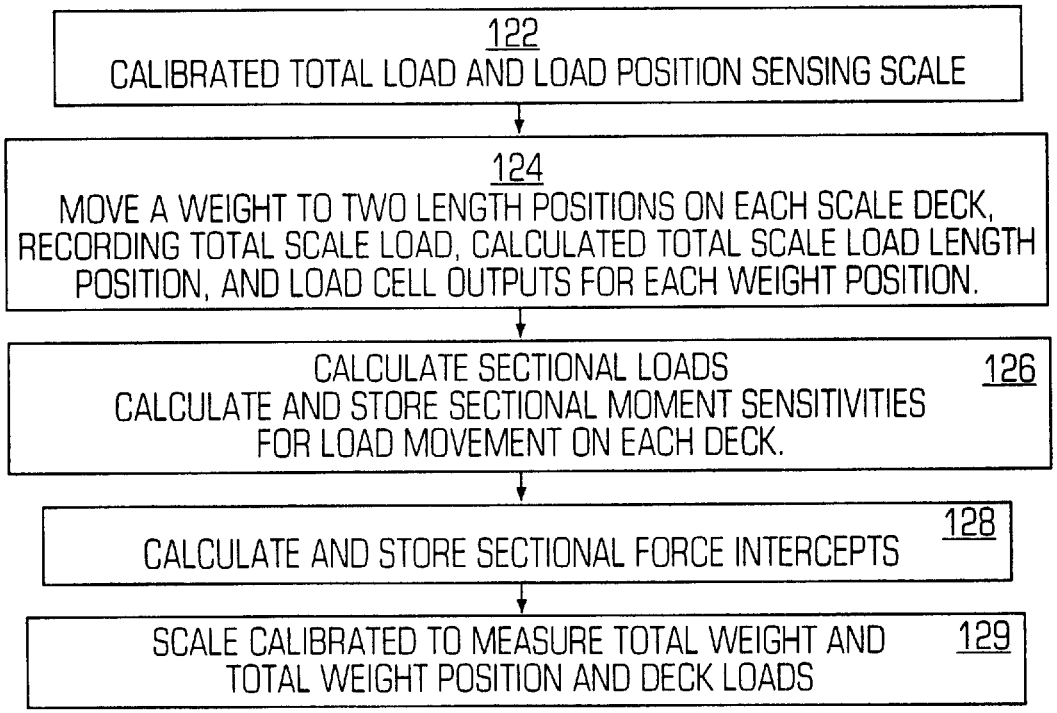
FIG. 7 illustrates a preferred embodiment of a scale calibration method in accordance with the invention for a total load, load position and deck loading sensing scale.

FIG. 7 illustrates a preferred embodiment of a scale calibration method 120 in accordance with the invention for a total load, load position and deck load sensing scale. In particular, in step 122, a calibrated total load and load position sensing scale is provided that has been calibrated as described in FIG. 6. In step 124, one of the calibration weights is moved to two length positions on each scale deck and various data, such as the total scale load, the calculated total scale load length position and the load cell outputs for each position, is determined and calculated and stored. In step 126, the sectional loads are calculated as described above and then the sectional moment sensitivities for load movement on each deck is calculated as described above and stored. In step 128, the sectional force intercepts as described above are calculated and stored. In step 129, the scale for measuring total weight and total weight position and deck loads has been calibrated. Now, the scale measurement method in accordance with the invention will be described in more detail.

Figure 8:
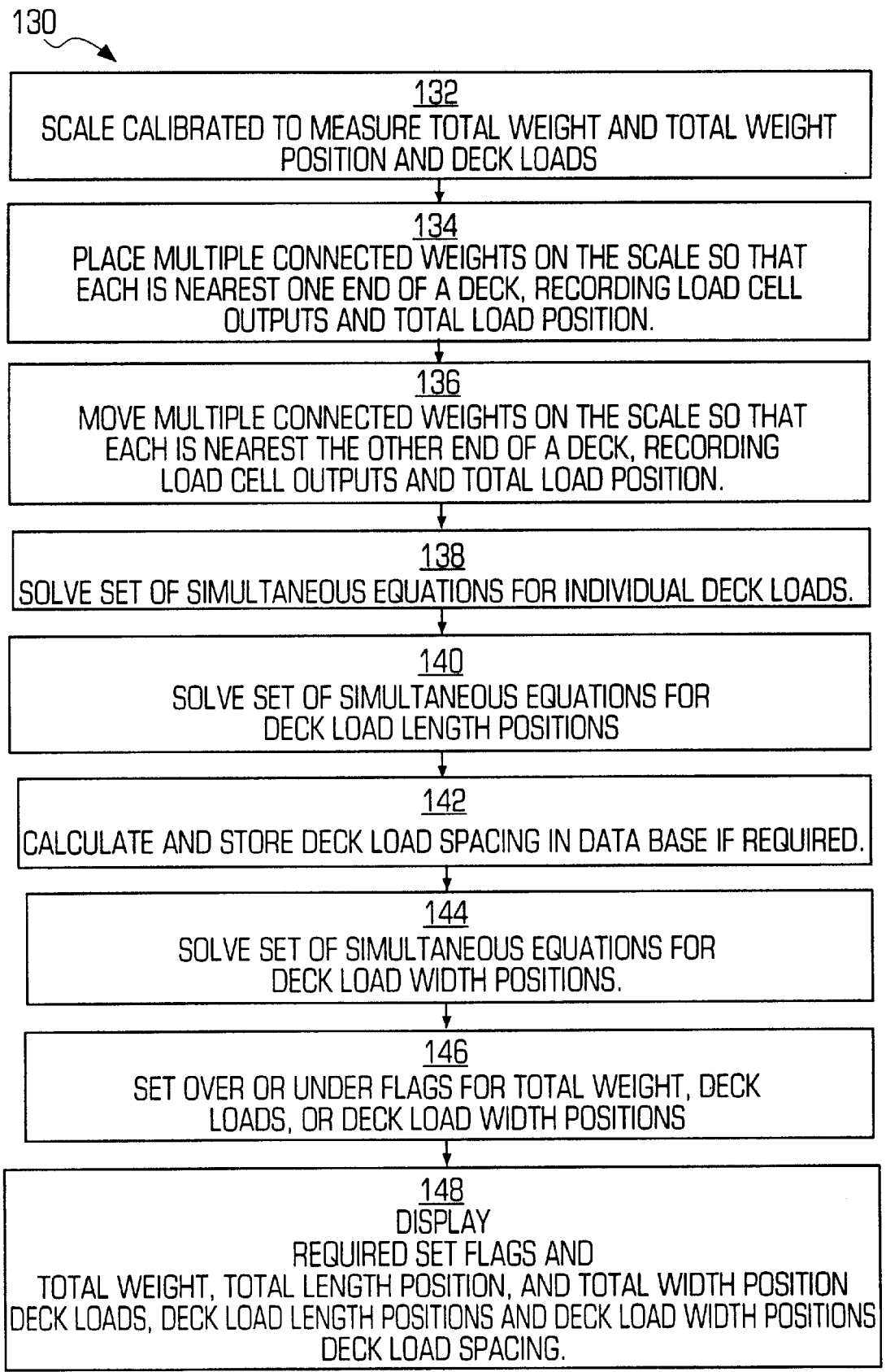
FIG. 8 illustrates a preferred embodiment of a scale measurement method in accordance with the invention for a total load, load position and deck load sensing scale requiring movement.

FIG. 8 illustrates a preferred embodiment of a scale measurement method 130 in accordance with the invention for a total load, load position and deck load sensing scale requiring movement. In step 132, a scale is calibrated as described above to measure total weight, total weight position and deck loads. In step 134, multiple connected weights are placed on the scale so that each weight is near one end of a deck and then the load cell outputs and total load position is recorded and stored. In step 136, the multiple connected weights are moved so that each weight is nearest the other end of the deck and the load cell outputs and total load position are calculated and stored. In step 138, a set of simultaneous equations are solved as described above for the individual deck loads. In step 140, a set of simultaneous equations are solved as described above for the deck load length positions. In step 142, the deck load spacings are calculated, if needed, and stored. In step 144, a set of simultaneous equations are solved as described above for the deck load width positions. In step 146, over and under flags are set for the total weight of the object, the deck loads of the object or the deck load width positions of the object that are out of range. In step 148, the display of the scale may indicate, among other things, the required set flags, the total weight of the object, the total length position of the object, the total width position of the object, the deck loads, the deck load length and width positions and the deck load spacing as a result of the object. Now, a method for measuring a scale with one-stop positioning will be described.

Figure 9:
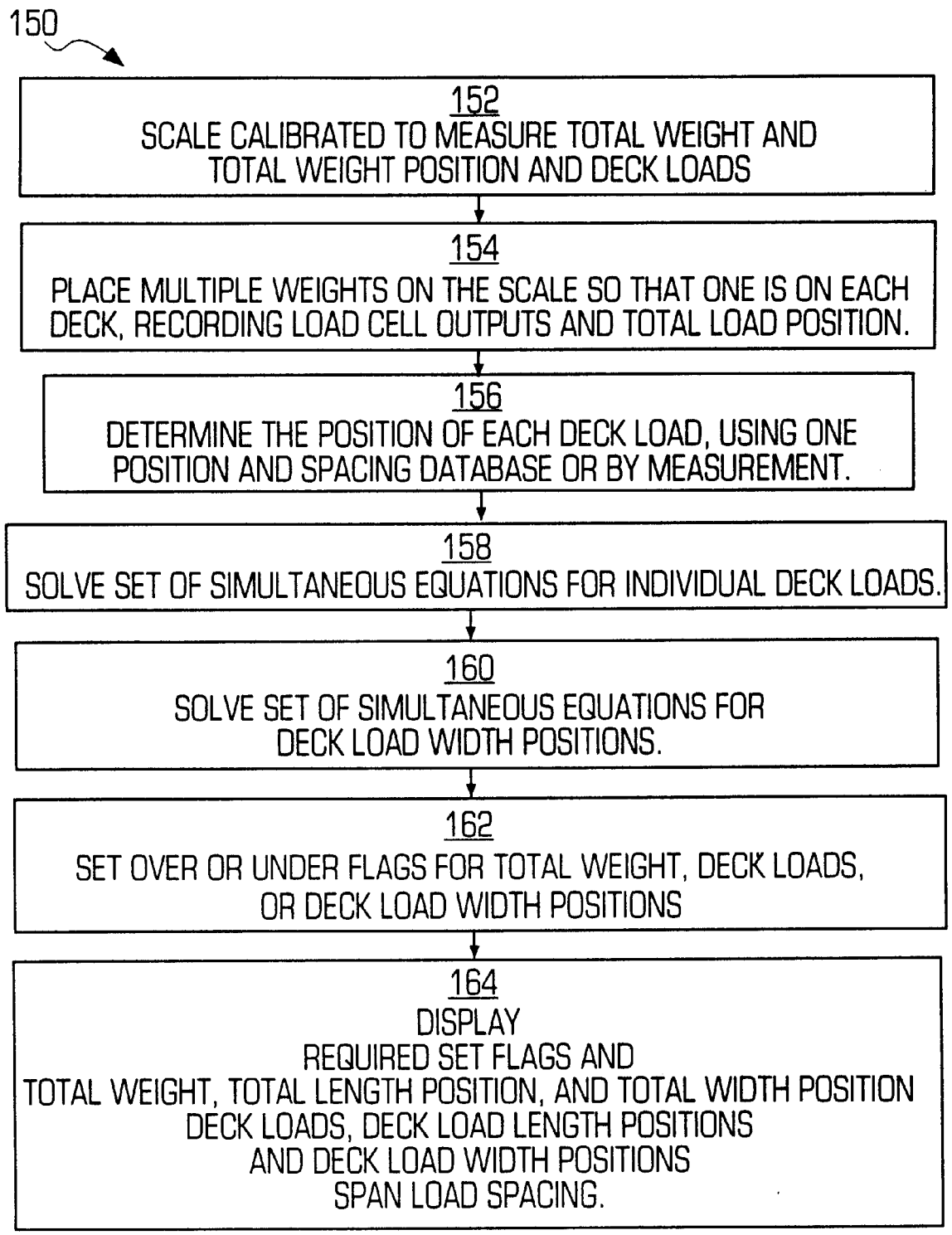
FIG. 9 illustrates a preferred embodiment of a scale measurement method in accordance with the invention for a total load, load position and deck load sensing scale requiring one stop positioning.

FIG. 9 illustrates a preferred embodiment of a scale measurement method 150 in accordance with the invention for a total load, load position and deck load sensing scale requiring one stop positioning. In particular, a scale is calibrated to measure total weight, total weight position and deck loads in step 152. In step 154, multiple weights are placed on the scale so that a weight is on each deck and then the load cell outputs and total load position is recorded and stored. In step 156, the position of each deck load is determined by using one position and spacing database or by measurement. In step 158, a set of simultaneous equations is solved for the individual load decks as described above. In step 160, a set of simultaneous equations is solved for the deck load width positions as described above. In step 162, the over and under flags are set for the total weight of the object, the deck load of the object or the deck load width positions that are out of range. In step 164, the display of the scale may indicate, among other things, the required set flags, the total weight of the object, the total length position of the object, the total width position of the object, the deck loads, the deck load length and width positions and the deck load spacing as a result of the object.

To better understand the invention, an example of the operation of the scale in accordance with the invention to measure the axle weights of a truck simultaneously will be described. First, the truck driver drives onto the scale and parks the truck with the steering axle on a line across the scale with the truck centered on the scale width. Next, the truck is identified and the scale operator enters the identification information into the scale indicator or a linked computer. Next, the truck is weighed in the first location and its position and weight are displayed and recorded. At this point, the scale operator chooses to measure tare weight or gross weight. If the empty truck was already weighed, then the gross and tared weights are enabled. If the empty truck was already weighed, then the load position and weight may be enabled. If the truck is about to load or unload then a tare determination mode is selected. If the truck is about to load while on the scale, a load mode may be enabled and the truck driver is directed to park at a predetermined position on the scale.

If the truck has been weighed to determine axle weights before, he may select the single stop axle weight mode. A database then loads the number of axles, and axle and wheel spacing into the scale indicator or linked computer. If the truck has not been weighed to determine axle weights before, the scale operator enters the number of axles, and axle and wheel spacing into the scale indicator or linked computer. For better accuracy or to determine axle spacing, he may direct the driver to move the truck forward to a second location where all of the axles are still on the decks they were on in the first location. If the truck is not centered on the scale, the off center distance may be entered. Then, the axle weights, wheel weights, and axle spacing are determined and the scale operator directs the next function.

In accordance with the invention, the vehicle weight alone may be displayed and/or printed. Alternatively, the vehicle weight and axle weights may be displayed and/or printed, the axle, and/or wheel weights out of preset ranges may be indicated, or the axle, and/or wheel weights may be displayed and/or printed. In addition, the axle, and/or wheel weights may be displayed and updated continuously to allow redistribution of the load. The estimated tire life remaining may be indicated, if the database has been updated for every shipment.

Based on the measurement using the scale in accordance with the invention, the driver of the truck has several options assuming that the truck does not conform to the requirements. If the truck conforms to the requirements, the driver leaves the scale. If the truck does not conform to the requirements, the driver may pick up the ticket and leave the scale, or may reposition the load while on the scale. The driver may also add additional load to the truck while on the scale. The driver may also remove load while on the scale if the load is too heavy. The scale operator may update the database and reset the scale.

While the foregoing has been with reference to a particular embodiment of the invention, it will be appreciated by those skilled in the art that changes in this embodiment may be made without departing from the principles and spirit of the invention, the scope of which is defined by the appended claims.

What is claimed is:

1. A force sensing apparatus, comprising:

an operating surface having a plurality of decks connected together for receiving an applied force from an object having a plurality of components, the applied force having a position relative to the operating surface and a magnitude;

a plurality of load cells wherein each of the plurality of load cells is located adjacent an edge of each of the plurality of decks, each load cell capable of receiving at least a portion of the applied force on the operating surface and providing a force value representative thereof; and a control system that simultaneously determines a centroid position of the object, an individual position of each of the plurality of components, and a load on each of the plurality of decks based on the force values from the load cells, and outputs one or more signals corresponding to the magnitudes of the applied forces from the object and the components.

2. The apparatus of claim 1 further comprising a display unit that displays the weights of the object and the components based on the signals.

3. The apparatus of claim 1, wherein the object includes a truck and the plurality of components include axles of the truck, wherein the control system determines the deck load based on a change in the centroid position and a fixed spacing between the components.

4. The apparatus of claim 1, wherein the plurality of load cells includes first, second and third load cells, each having a position relative to the operating surface, and wherein a position sensing means determines the one or more position of the applied force in two dimensions.

5. The apparatus of claim 4, wherein the plurality of load cells includes a fourth load cell, and wherein the load cells are mounted to the one or more decks at spaced apart positions near the edges of the decks.

6. The apparatus of claim 1, wherein the decks are simply connected together, providing a linear relationship between the position of the applied force and the portion received by the load cells.

7. A force sensing apparatus, comprising:

a load receiving means having an operating surface with a plurality of decks connected together that receives an applied force from an object having a plurality of components, the applied force having a position relative to the load receiving means and a magnitude;

load cell means having a plurality of load cells wherein each of the plurality of load cells is located adjacent an edge of each of the plurality of decks, each load cell capable of receiving at least a portion of the applied force on the operating surface and providing a force value representative thereof;

means for simultaneously determining a centroid position of the object, an individual position of each of the plurality of components, and a load on each of the plurality of decks based on the force values from the load cells, the location and weight of the one or more objects; and means for outputting one or more signals corresponding to the magnitudes of the applied forces.

8. The apparatus of claim 7 further comprising a display unit that displays the weights of the object and the components based on the one or more signals.

9. The apparatus of claim 7, wherein the object includes a truck and the components include a front axle and one or more rear axles, wherein the means for simultaneously determining determines the deck load based on a change in the centroid position and a fixed spacing between the components.

10. The apparatus of claim 7, wherein the plurality of load cells includes first, second and third load cells, each having a position relative to the operating surface, and
wherein a position sensing means determines the one or more position of the applied force in two dimensions.

11. The apparatus of claim 10, wherein the plurality of load cells includes a fourth load cell, and wherein the load cells are mounted to the one or more decks at spaced apart positions near the edges of the decks.

12. The apparatus of claim 7, wherein the decks are simply connected together, providing a linear relationship between the position of the applied force and the portion received by the load cells.

13. A force sensing apparatus for determining the total load and axle loads of a truck, comprising:

an operating surface having one or more decks connected together for receiving an applied force from the truck, the applied force having a position and a magnitude corresponding to a load on each axle of the truck;

a plurality of load cells wherein each of the plurality of load cells is located adjacent an edge of a deck, each load cell receiving at least a portion of the applied force on the operating surface and providing a force value representative thereof; and a control system that simultaneously determines, based on the force values from the load cells, the location and load for each truck axle and the total weight of the truck and outputs one or more signals corresponding to the magnitude of the total weight of the truck and the load on each axle.

14. The apparatus of claim 13 further comprising a display unit that displays the total weight of the truck and the load on each axle.

15. The apparatus of claim 13, wherein the plurality of load cells includes first, second and third load cells, each having a position relative to the operating surface, and
wherein the position sensing means determines the position of the applied force in two dimensions.

16. The apparatus of claim 15, wherein the plurality of load cells includes a fourth load cell, and wherein the load cells are mounted to the one or more decks at spaced apart positions near the edges of the decks.

17. The apparatus of claim 13, wherein the decks are simply connected together, providing a linear relationship between the position of each axle of the truck and the portion of the axle load received by the load cells.

18. A force sensing apparatus for determining the total load and axle loads of a truck, comprising:

a load receiving means having an operating surface with one or more decks connected together that receives an applied force from the truck, the applied force having a position and a magnitude corresponding to a load on each axle of the truck;

load cell means having a plurality of load cells wherein each of the plurality of load cells is located adjacent an edge of a deck, each load cell capable of receiving at least a portion of the applied force on the operating surface and providing a force value representative thereof;

means for simultaneously determining, based on the force values from the load cells, the total weigh of the truck and the loads on each axle of the truck; and means for outputting one or more signals corresponding to the magnitude of the total weight of the truck and the axle loads.

19. The apparatus of claim 18 further comprising a display unit that displays the total weight of the truck and the load on each axle.

20. The apparatus of claim 18, wherein the plurality of load cells includes first, second and third load cells, each having a position relative to the operating surface, and
wherein the position sensing means determines the position of the applied force in two dimensions.

21. The apparatus of claim 20, wherein the plurality of load cells includes a fourth load cell, and wherein the load cells are mounted to the one or more decks at spaced apart positions near the edges of the decks.

22. The apparatus of claim 18, wherein the decks are simply connected together, providing a linear relationship between the position of each axle of the truck and the portion of the axle load received by the load cells.

23. The apparatus of claim 1, wherein the control system further comprises a set of computer-readable instructions for determining a sectional sensitivity of each of the plurality of decks based on a movement of the object on each deck and using the sectional sensitivity to determine the load on each of the plurality of decks, wherein the sectional sensitivity ($Ms_{i,v}$) is calculated according to the equation:

$$Ms_{i,v} = \frac{\Delta Fs_{i,v}}{\Delta x_v \cdot w_v}$$

where $Ms_{i,v}$ is the sensitivity of sectional forces $Fs_i$ to a moment change about an axis perpendicular to movement $\Delta x_v$ of deck weight $w_v$ on deck "v", and $\Delta Fs_{i,v}$ is the changes in section loads on the sections "i" due to load movement on deck "v".

24. The apparatus of claim 1, wherein the control system determines a total weight of the object.

25. The apparatus of claim 7, wherein the control system determines a total weight of the object.

26. The apparatus of claim 13, wherein the one or more decks are connected together such that the load on a particular deck is not directly equal to the sum of the forces on individual load cells supporting the particular deck.

27. The apparatus of claim 18, wherein the one or more decks are connected together such that the load on a particular deck is not directly equal to the sum of the forces on individual load cells supporting the particular deck.

28. A method of determining a weight and axle loads of a truck, the method comprising:

calibrating a scale for accurate weight, centroid measurement, and deck load measurement, wherein the scale includes a plurality of decks, each of the plurality of decks being coupled to at least one load cell that measures a force applied on one of the plurality of decks;

determining a sectional moment sensitivity for each of the plurality of decks by measuring a change in sectional forces produced by a change in truck position;

determining a centroid position where sectional forces on the plurality of decks are zero;

determining a deck load centroid position for each axle load; and determining individual deck loads by positioning each axle on one of the plurality of decks and computing a sum of a product of measured sectional forces and the deck load centroid position of each load.

29. The method of claim 28, wherein the calibrating comprises:

determining, for each of the at least one load cell, a product of a force measured by each of the at least one load cell and a span factor for each of the at least one load cell;

determining the calibration weight by summing the product associated with each of the at least one load cell;

determining a load cell location for each of the at least one load cell; and determining a sensitivity to load movement for each of the at least one load cell.

30. A force sensing apparatus for determining the total load and axle loads of a truck, the apparatus comprising:

at least two decks supported by a plurality of load cells, the at least two decks sharing at least one supporting load cell;

means for measuring axle positions on the at least two decks;

means for measuring a centroid of the truck and a movement of the truck on the at least two decks;

means for determining an individual deck load for each of the at least two decks wherein the individual deck load indicates axle loads, and a total load on the at least two decks based on the measured positions and the centroid of the truck; and an output device for displaying the individual deck load and the total load.

* * * * *